UNITED STATES PATENT OFFICE.

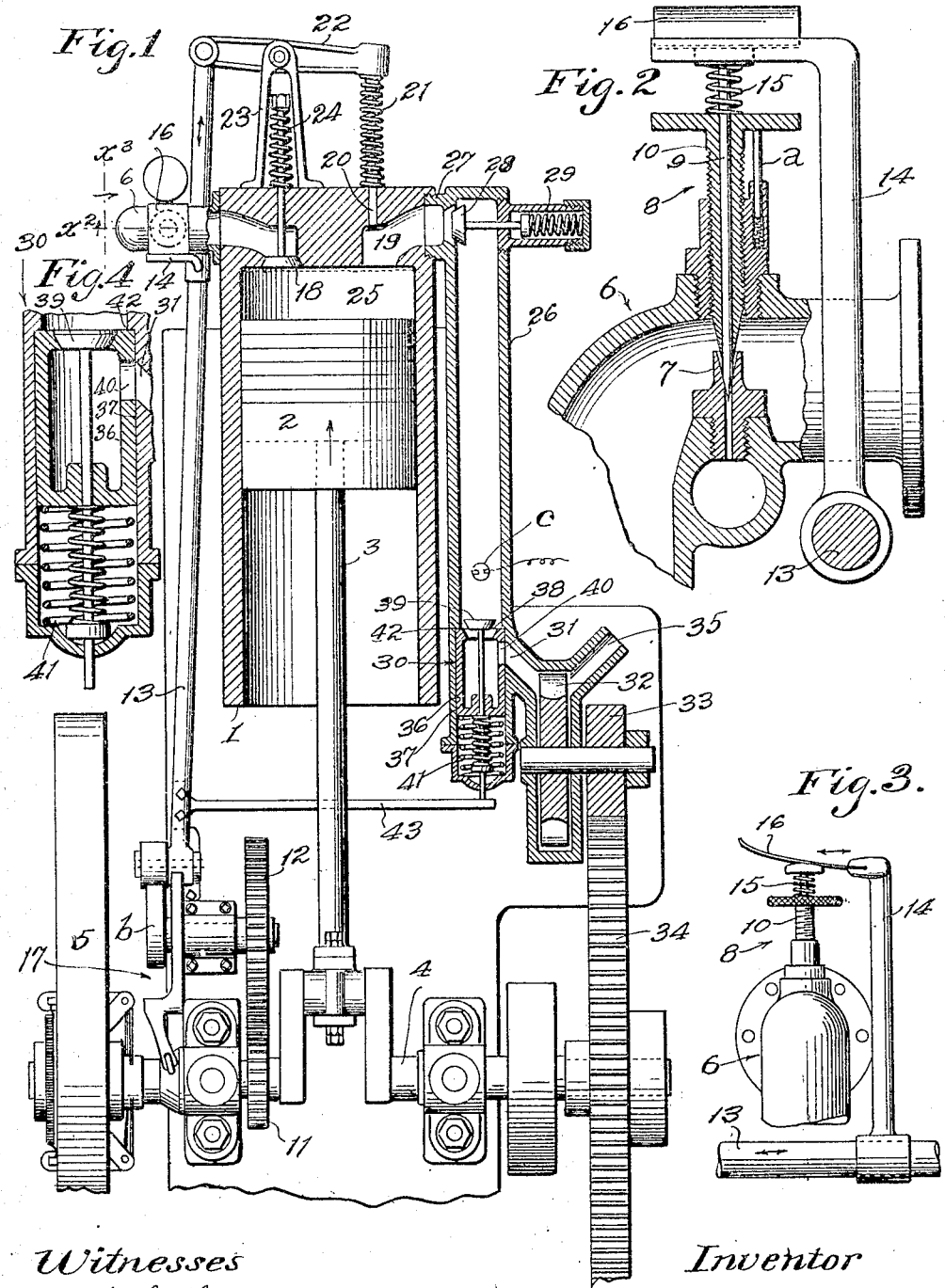

LEANDER E. FISH, OF LOS ANGELES, CALIFORNIA.

INTERNAL-COMBUSTION ENGINE.

No. 925,766.   Specification of Letters Patent.   Patented June 22, 1909.

Application filed February 21, 1908.   Serial No. 417,201.

*To all whom it may concern:*

Be it known that I, LEANDER E. FISH, a citizen of the United States, residing at Los Angeles, in the county of Los Angeles and State of California, have invented new and useful Improvements in Internal-Combustion Engines, of which the following is a specification.

This invention relates to improvements whereby a turbine engine can be made to operate practically under impulses of caloric applied directly from internal combustion.

A great difficulty to be overcome in order to make internal combustion turbine engines operate in a practical manner is that of cooling the turbine. Without effective cooling, great injury results to the operative parts by reason of the great heat applied directly to them.

One object of my invention is to provide improved means to remove the internal heat.

Another object is to utilize the removed heat to generate power for driving the turbine.

These objects are attained by making provision whereby cooling charges of atmospheric air may be introduced into the combustion chamber and thence discharged upon the vanes of the turbine; and whereby the heat of the combustion chamber is utilized for expanding the charges of atmospheric air introduced into such chamber and directing the air thus expanded to the turbine to impel the same.

An object is to provide for thorough scavenging of the burned charge.

An object is to avoid the expense now commonly involved with internal-combustion engines in the frequent destruction from burning out of the exhaust-valve.

An object of the invention is to provide means whereby the impulse from the internal-combustion may effect its own emission from the combustion chamber to the turbine and to apply the maximum number of thermal units from the explosive charge to the vanes of the turbine, and to do this as directly as possible.

A further object of the invention is to provide means which may be applied in the form of an attachment to an ordinary reciprocating gas engine whereby said gas engine may be transformed into an operative part of a turbine engine, thus making use of four-cycle reciprocating engines already on the market. In this manner the ordinary reciprocating internal-combustion engine may be utilized as a pump for compressing the explosive mixture and for passing through the combustion-chamber to the turbine a cooling charge of air which may also be effective to assist in operating the turbine.

It will be unnecessary in the accompanying drawings to make full illustration of the well-known reciprocating gas engine, and I shall therefore illustrate my invention in such a manner that it may be understood by those versed in the art.

The invention may be variously embodied and is not limited to the specific details hereinafter particularly set forth.

The invention includes the engine and the novel parts and combinations of parts hereinafter described. The apparatus shown is capable of use in carrying out the method of utilizing the thermal units which consists in supplying to the hot combustion-chamber a charge of expansive cooling medium and discharging such medium while expanded upon an impeller.

The accompanying drawings illustrate the invention in one form of its embodiment.

Figure 1 is a fragmental, sectional view of an apparatus embodying this invention. Fig. 2 is a sectional detail on line $x^2$, Fig. 1, showing the fuel cut-off valve. Fig. 3 is a detail elevation of said valve from line $x^3$, Fig. 1. Fig. 4 is a detail of the impulse valve in position just before emitting the products of combustion to the turbine.

1, 2, 3, 4 and 5, respectively designate the usual cylinder, piston, piston-rod, crank-shaft, and fly-wheel of an ordinary internal combustion engine. The piston is shown in Fig. 1 approaching the end of the cooling stroke. Dotted lines indicate the position of the piston at the end of such stroke. 6 is the air-inlet; 7, the fuel-nozzle therein; and 8, a duplex-valve to control said nozzle. Said valve comprises a reciprocating cut-off needle 9 adapted to close and open the nozzle 7, and a hollow regulating needle 10 adapted to close the orifice of the nozzle 7 to a greater or less extent around the cut-off needle 9, so that the maximum amount of fuel that may flow through the nozzle may be determined by setting the screw-threaded needle 10, and the nozzle may be alternately closed and opened by the needle 9 for the purpose of preventing fuel from being emitted at the nozzle when it is desired to direct a cooling medium as pure atmospheric air through the engine; and said nozzle may be opened to allow the emission of fuel when it is desired to direct a charge of explosive mixture into the engine. *a* designates a bolt to lock the needle 10 from accidental rotation. 11 and 12 designate the members of a one-to-two gear driven by the crank-shaft to operate a cam *b* to reciprocate a rod 13, thereby to operate an arm 14 to close the valve-needle 9 at every other stroke of the piston 2. 15 designates a spring to return the needle 9 to open position when the pressure of the arm 14 ceases. Said arm 14 may be arranged to resiliently press the needle 9 into its seat in the nozzle 7, as indicated by the flat spring extension 16 thereof, shown in the drawings. By this construction an explosive mixture will be supplied to the cylinder 1 at one stroke of the engine, and atmospheric air will be supplied at another stroke.

Any well-known form of governing means employed in a four-cycle engine may be provided to hold the rod 13 in its valve-closing position during the stroke which would ordinarily cause said valve to be released, thereby to cause an intermission of fuel supply when the speed becomes too high. 17 designates in a general way governing mechanism of the ordinary type for this purpose.

18 designates the usual intake-valve, and 19 the usual exhaust-port which in the present instance serves as a port through which the explosive mixture at one stroke, and the cooling atmospheric air at another stroke will be expelled from the cylinder 1.

20 designates a plug to close the orifice provided in the ordinary engine for the stem of the exhaust-valve which becomes superfluous in this application and must therefore be omitted in order to adapt the common internal-combustion cylinder 1 to the use I propose.

21 designates the spring operating through walking-beam 22 in the usual manner, to return the usual valve-rod 13 in the usual way.

23 is the usual post for the walking-beam 22, and 24 the spring for closing the inlet-valve 18, which valve opens by suction alone and is closed by said spring 24 and the pressure within the compression chamber 25 of the cylinder 1.

26 designates an internal combustion chamber preferably in the form of a tube having a nipple 27 screwed into the port 19 and controlled by a valve 28 to normally close by a spring 29 and opening responsive to pressure from the chamber 25 to admit to the combustion-chamber 26 the alternating charges of explosive mixture and of atmospheric air.

30 designates in a general way a duplex impulse valve controlling a port 31 through which the contents of the chamber 26 may be discharged upon the vanes of a turbine 32 that is connected by gearing 33, 34, with the crank-shaft 4.

35 designates the turbine exhaust-port. The duplex valve 30 comprises a hollow valve-body 36 adapted to reciprocate in a seat 37 at the discharge end of the chamber 26 and has a passage provided with an inlet-port 38 normally closed by a spring-pressed valve 39, and also provided with an outlet-port 40 adapted to register with the port 31 when the valve-body 36 is in its normal seated position. When said valve 39 is seated, as shown in Fig. 4, it,—together with the end of the valve-body 36,—forms a piston to receive pressure from within the chamber 26. The spring 41 which holds the valve-body 36 seated against a stop 42 therefor, is of sufficient strength to resist the pressure of the charge of explosive mixture introduced into the chamber 26 by the operation of the piston 2, thus to hold said charge under compression.

*c* designates an igniter in the chamber 26, preferably near the outlet end thereof and operable by the usual means, not shown, to ignite an explosive charge after the valve 28 has been closed. The force of each explosion is applied to the valve-body 36 through the valve 39, and said body yields to the pressure thereof, thus compressing the spring 41 until the port 31 is open, and thereupon the products from the combustion occurring in the chamber 26 issue through the port 31 to the turbine 32 to impel the same, thereby applying power through the gears 33, 34, to the crank-shaft 4 to operate the piston 2 and other elements above-described. The ignition may be so timed that at the close of the emission of the products of combustion a charge of cool atmospheric air will be expelled from the chamber 25 into chamber 26.

43 designates an element operable by the crank-shaft 4 to open the valve 39, and so timed that said valve is opened at the close of the emission of the products of combustion, and at the beginning of the injection of atmospheric air from chamber 25, so that such air passes on through the chamber 26, thereby to take up the heat remaining from the explosion. This heat tends to cause an expansion of the charge of air, and at the close of the stroke of the piston 2, the valve 28 closes, and any subsequent expansion of the air in the chamber 26 may be effective to expel air past the valve 29 and through the port 31 to the turbine 32. As the piston 2 now recedes, a charge of explosive mixture will be sucked in past the valve 18, and at the return stroke of the piston such explosive mixture will be forced into the chamber 26, the arm 43 holding open the valve 39 until the atmospheric air has been practically discharged and then releasing the valve 39 and allowing the same to close to hold the explosive charge until it is ignited after the close of the charging stroke of the piston 2, whereupon the operation above-described is repeated.

I claim:—

1. The combination with a combustion chamber having an exhaust port, of a valve-body provided with a passage communicating between said port and the interior of said chamber, a valve to normally close said passage, yielding means to hold said valve-body in position with said passage in communication with said exhaust port, and means to unseat the valve of said passage whereby communication between said port and the interior of said chamber can be opened by movement of said passage valve, and also by the movement of said valve-body.

2. The combination with a combustion chamber, of means to supply thereto in alternation a fuel charge and a cooling medium, said chamber being provided with an exhaust-port; a hollow valve body provided with a passage communicating between said exhaust-port and the interior of said chamber, a valve to normally close said passage, yielding means to normally hold said valve-body in position with its passage registering with said port, means to open said passage-valve when said first-mentioned means is supplying the cooling medium to said chamber and to allow the valve to close to retain the fuel charge supplied by said first-mentioned means, and means for igniting the fuel charge in said chamber, said valve-body being adapted to withstand the pressure of the fuel charge and to yield to the pressure of the products of combustion of said charge, to open communication between said chamber and said port for the escape of the products of such combustion.

3. A combustion chamber having an exhaust port, a valve body having a passage communicating between said port and the interior of said chamber, a valve to normally close said passage, yielding means to hold said valve body in position with said passage in communication with said exhaust port, means to supply fuel to the combustion chamber, means to ignite said fuel, means to open the valve of said passage to open communication between said port and the interior of said chamber, and means to supply a cooling medium to said chamber, said yielding means being adapted to withstand the pressure of the charge of fuel and to yield to the pressure caused by the combustion of such fuel.

In testimony whereof, I have hereunto set my hand at Los Angeles, California, this 14th day of February, 1908.

LEANDER E. FISH.

In presence of—
    JAMES R. TOWNSEND,
    L. BELLE RICE.